Figure 1:
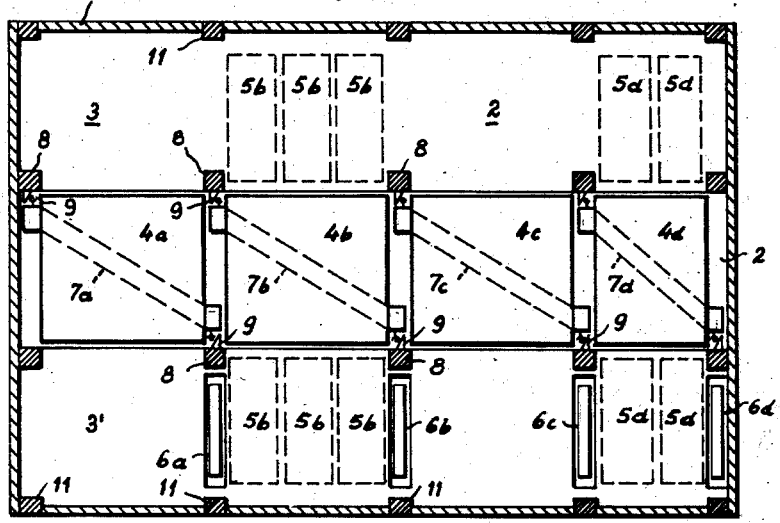

April 2, 1963  E. G. BIANCA  3,083,792
HOISTING ARRANGEMENT
Filed May 2, 1958  7 Sheets-Sheet 1

INVENTOR:
EDOARDO G. BIANCA
Richards & Geier
ATTORNEYS

April 2, 1963 E. G. BIANCA 3,083,792
HOISTING ARRANGEMENT
Filed May 2, 1958 7 Sheets-Sheet 3

INVENTOR:
Edoardo G. Bianca
Richards & Geier
ATTORNEYS

April 2, 1963     E. G. BIANCA     3,083,792
HOISTING ARRANGEMENT
Filed May 2, 1958     7 Sheets-Sheet 5
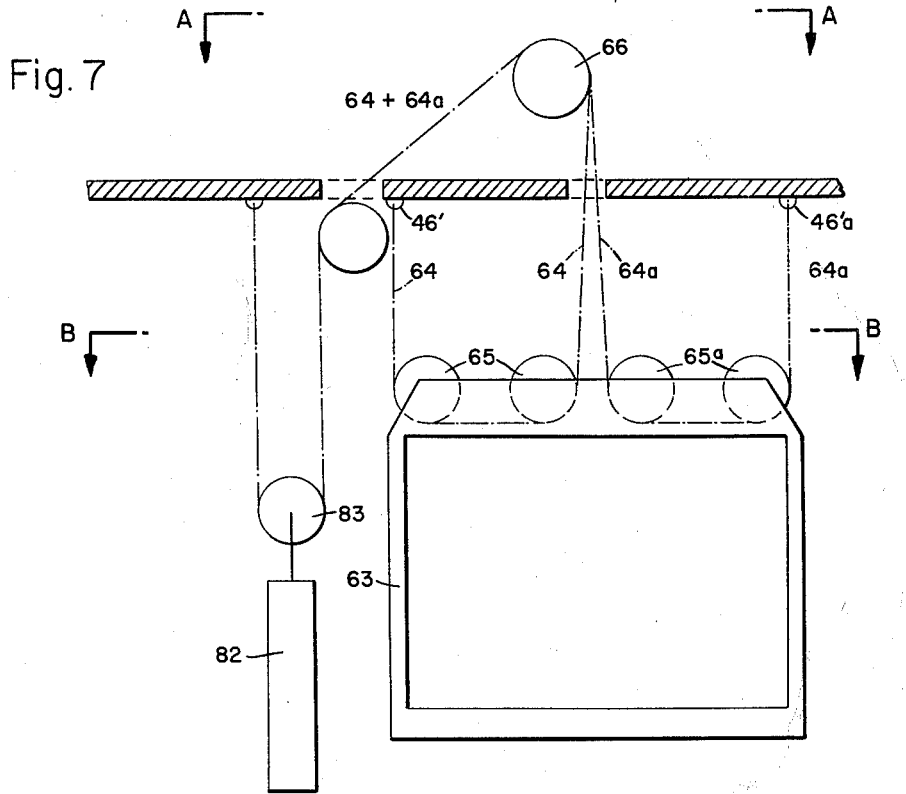
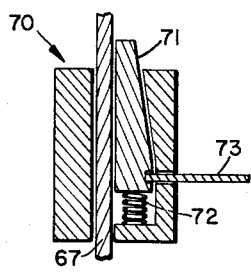
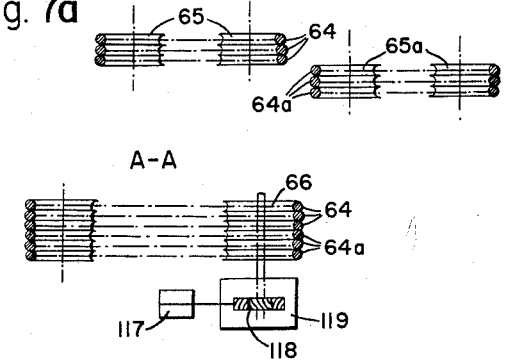
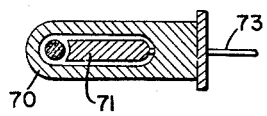
INVENTOR
EDOARDO G. BIANCA
BY Richards & Geier
ATTORNEYS April 2, 1963 E. G. BIANCA 3,083,792
HOISTING ARRANGEMENT
Filed May 2, 1958 7 Sheets-Sheet 7
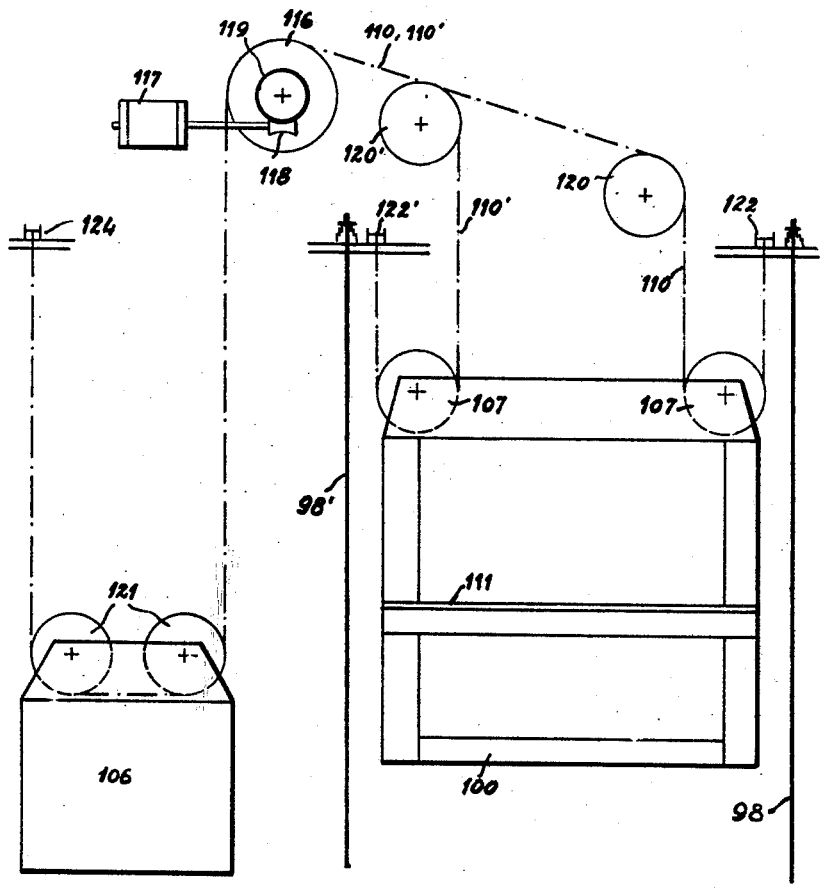
INVENTOR:
Edoardo G. Bianca
Richards & Geier
ATTORNEYS United States Patent Office 3,083,792
Patented Apr. 2, 1963

3,083,792
HOISTING ARRANGEMENT
Edoardo G. Bianca, Zollikon, near Zurich, Switzerland, assignor to Silopark S.A., St. Moritz, Switzerland, a corporation of Switzerland
Filed May 2, 1958, Ser. No. 732,600
Claims priority, application Austria May 2, 1957
2 Claims. (Cl. 187—95)

The present invention relates to a hoisting arrangement especially for the transportation of vehicles to and from the parking places in mechanical garages. Known arrangements of this nature consist as a rule of two sections of buildings which are arranged one beside the other and one over the other, and contain, on the sides of the buildings facing one another, open cells, a horizontally and vertically movable hoisting installation being arranged in the space between the two wings of the buildings. This installation moves the vehicles in each case between an entry point and a cell and between the cell and an exit point. The hoisting cabin may be provided with a mechanical vehicle-shifting device which— possibly completely automatically—effects the moving of the vehicles from the cabin or into the cabin of the vertical lift. The lift installation can also be constructed as a stationary or suspended, laterally movable tower containing the vertical lift. These installations are however limited in their capacity, since they only permit a turnover figure of a maximum of about sixty vehicles per hour. This determines the number of vehicle spaces which can be served by one conveying installation at about 80–120. On the other hand the number of stories of the building wing will not be able to exceed twelve, in view of the construction and weight of the lift installation. If for reasons of space one is compelled to exceed this number of stories, then only vertically movable lifts are advantageously used. This embodiment, which only serves two vehicle spaces per story, is however only economical as from a number of stories from 40 onwards.

It is the purpose of the present invention to provide an installation with which it is possible to serve more than one and less than five vehicle spaces disposed horizontally side-by-side, in fact without the use of a lift arrangement movable horizontally as a whole. In this manner, the economy limit of horizontally movable lift installations, lying at twelve stories, can be exceeded, there being the further requirement that a plurality of lift units must be aligned with one another, in order in each case to achieve an economical total containing capacity and the corresponding turn-over capacity (by increasing the number of lift units).

Now installations consisting of a plurality of individual lifts placed together have already been proposed and in one individual case constructed (admittedly without transverse displacement), but these have always been of such a nature that in each case each individual lift cabin possessed its own independent shaft. Thus in fact lifts could be used in the standard style of construction, but the space requirements and the expense proved prohibitive for the purpose.

In contrast to such single lifts, the present invention relates solely to so-called series lifts, that is to say two or more independent lifts which are housed in one and the same, common shaft, interrupted by no kind of transverse connections.

Figure 2:
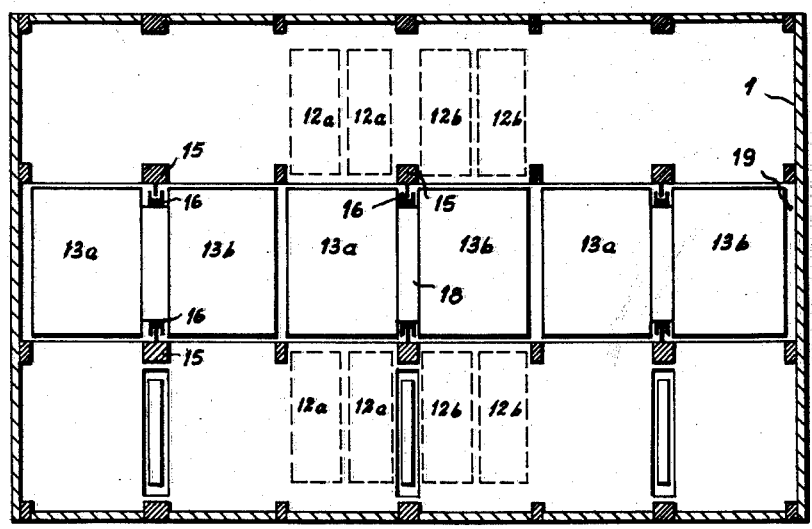
Figure 3:
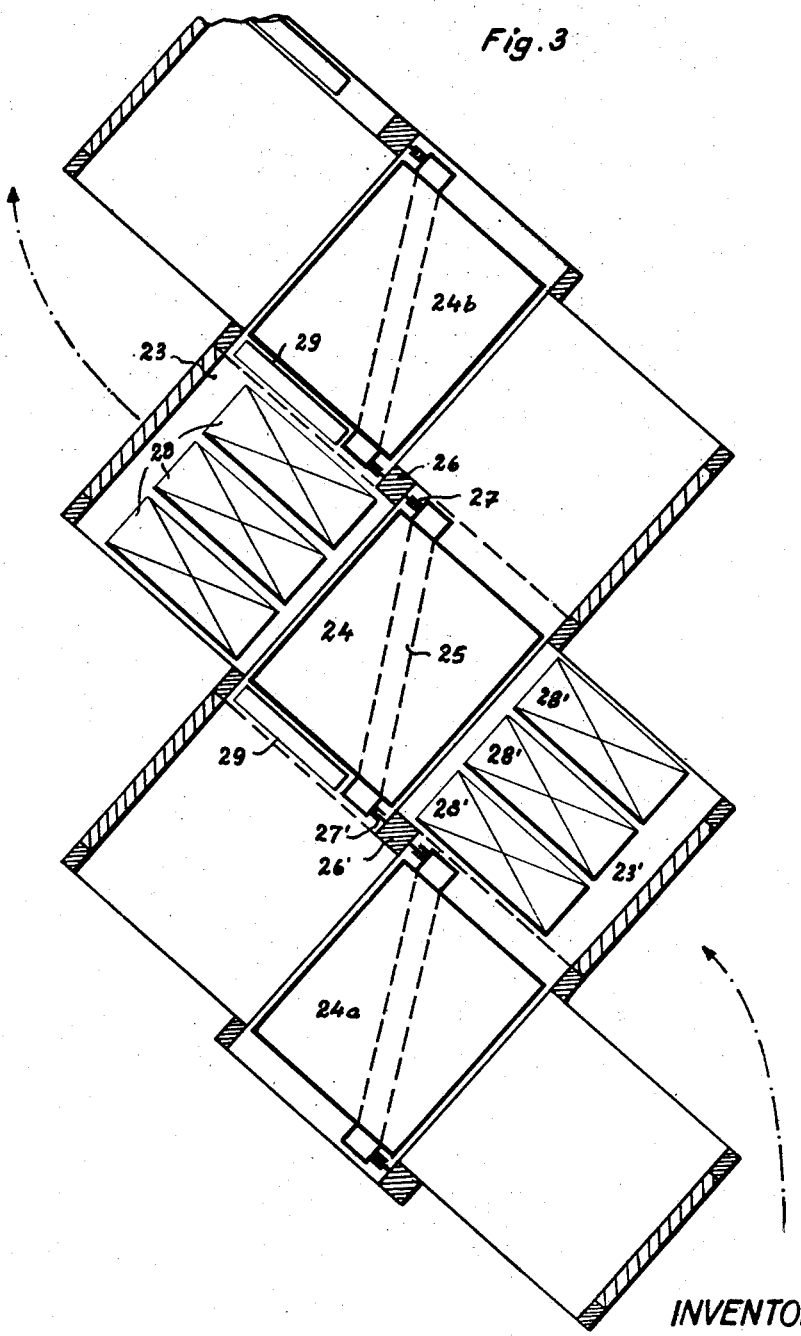
Figure 4:
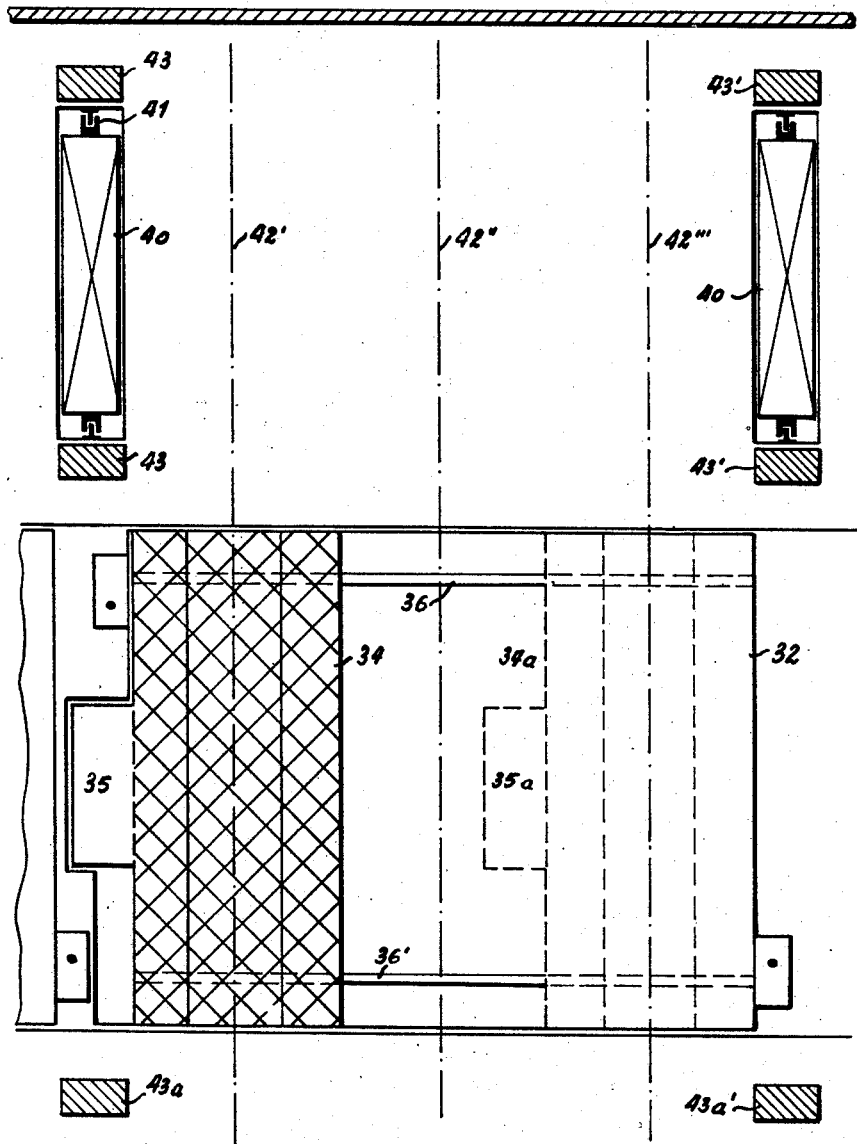
Figure 5:
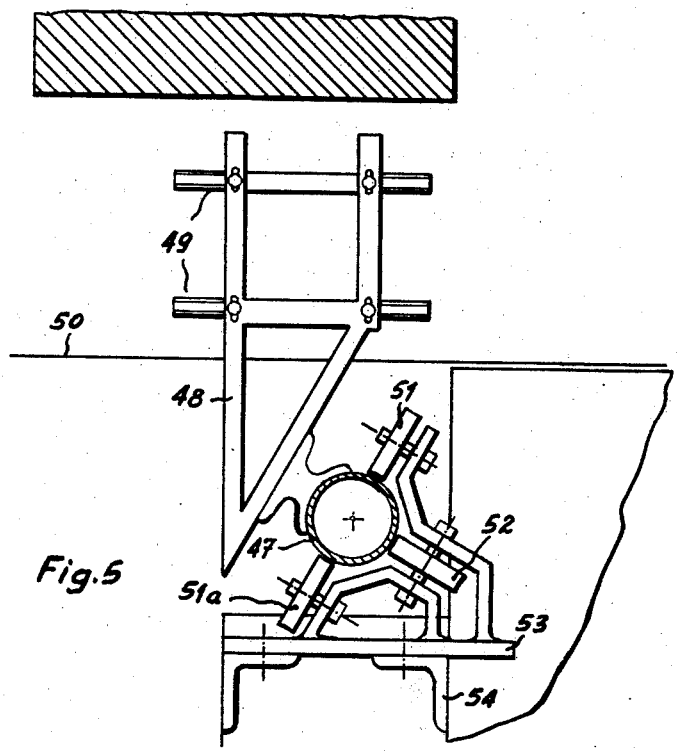
Figure 6:
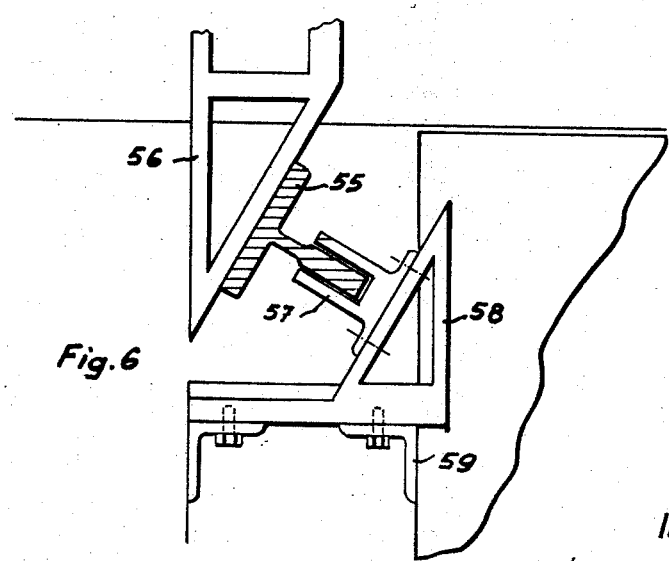
Figure 10:
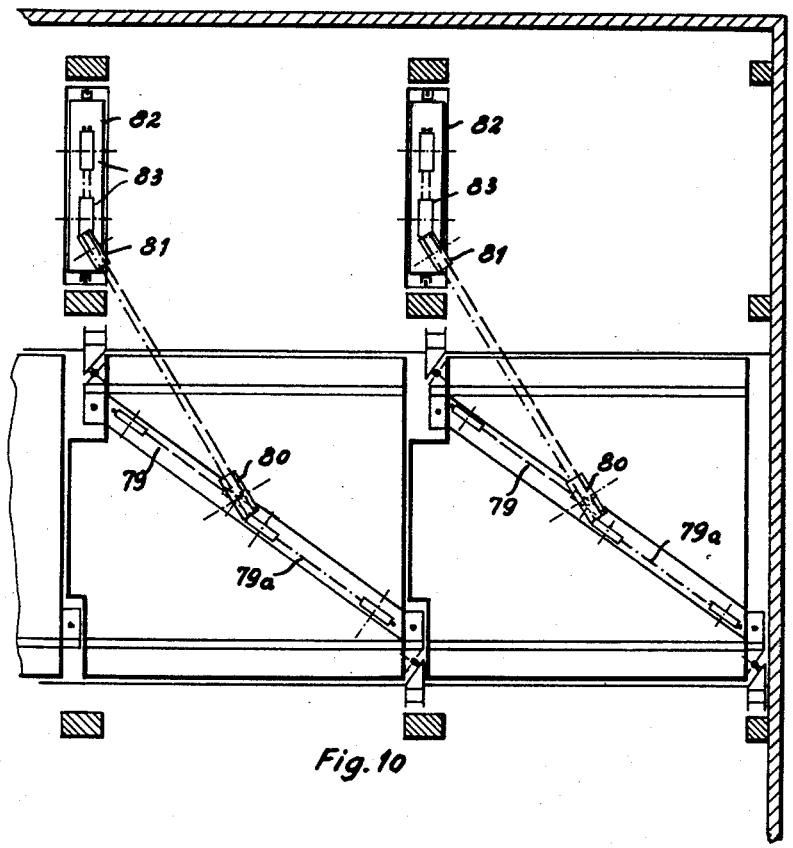

Some examples of embodiment of the invention are illustrated in the accompanying drawings, wherein:

FIGURE 1 shows the plan of one story of a mechanical garage with a first example of embodiment of a lift installation in accordance with the invention, FIGURE 2 shows the plan of a story of a mechanical garage with a second example of embodiment of a lift installation in accordance with the invention, FIGURE 3 shows a further embodiment of the lift installation, FIGURE 4 shows the plan view of a lift cabin and the arrangement thereof and of the counter-weights, FIGURE 5 shows the lateral guidance of the lift cabin, FIGURE 6 shows a variant of the lateral guidance, FIGURE 7 shows the suspension of the lift cabin in accordance with the invention, FIGURE 7a is a plan view of the apparatus shown in FIG. 7, FIGURE 8 shows a longitudinal section and FIGURE 9 a cross-section through the check device of the lift cabin, FIGURE 10 shows the suspension of the lift cabin in plan view, and FIGURES 11 and 12 show the cable guidance for the cabin in accordance with a variant.

In the drawings, in the embodiment shown in FIGURE 1, 1 designates a quadrangular building of a plurality of stories. In this building there is a shaft 2, in which four lift 4a, 4b, 4c, 4d are arranged. The lifts are arranged in the region of the central longitudinal axis of the building, while the wings of the building, present on the two sides of the lifts, are designated by 3 and 3'. The lifts 4a, 4b, and 4c are designated to receive three vehicles 5b each, while the lift 4d is arranged to receive two vehicles 5d.

For the purpose of avoiding intermediate walls the guides for the individual lifts are arranged on opposite sides of the shaft, so that a continuous free lift shaft is formed. The said guides are designated by 9 in FIGURE 1 and are placed on vertical support columns 8 of the building. Between the guides there are arranged support frames 7a, 7b, 7c, 7d. These are constructed as quadrangular frames closed in ring fashion, which lie each in a vertical plane and connect the longitudinal sides of the shaft. For example the frame ring can comprise two vertical and two horizontal members connected together to form a rectangular closed figure or ring. Since the arrangement of the guides and cabin frames of the different lifts does not permit the placing of counter-weights in the shafts, these are housed outside of the shaft between the vehicle spaces, and in fact the counter-weights 6a, 6b, 6c, 6d are arranged between the inner support columns 8 and the outer support columns 11 of the building.

According to the embodiment represented in FIGURE 2, twin lifts are provided in the common lift shaft 19, each of which comprises a left-hand platform 13a and a right-hand platform 13b. Again each serves two vehicle spaces 12a and 12b. The guides 16 are secured to the central support columns 15 of the building, and between the guides there lies a cabin support frame 18. The platform can also be made continuous for all four parking spaces, in which case then one transverse shifting carriage per lift is sufficient.

An embodiment wherein the lift 24, 24a, and 24b are arranged in staggered fashion transversely of the longitudinal axis of the lift shaft is represented in FIGURE 3. The building supports are designated by 26 and 26', and again carry guides 27, 27'. In the cells 23, 23' there lie three vehicle spaces 28, 28' in each case. The numeral 25 designates the support frame of the cabin 24. The pertinent counter-weight 29 is guided between the support columns.

Due to the staggered arrangement the driving in and out takes place at 45°, whereby the width of the entry and exit ways is reduced by half. The two opposite cabin sides, corresponding to the longitudinal sides of the shaft, are completely open, in order to facilitate driving the vehicle in and out in an unhindered fashion.

In FIGURE 4 a cabin 32 is shown in an enlarged representation. This cabin is designed for three vehicles 42′, 42″ and 42‴, and has a transverse carriage 34 which is mobile on longitudinal rails 36, 36′, and is provided with a driving position 35. On the right-hand side of FIGURE 4 there is represented the transverse carriage, in the completely run-out position 35a, 34a. The building supports are designated by 43, 43a and 43′, 43a′, between which a counter-weight 40 runs by means of guides 41.

Details of the cabin guidance are represented in FIGURES 5 and 6. A tubular guide 47 is secured in anchor rails 49 of the floor 50 by means of a holder 48. Against the tubular guide 47 lie rollers 51, 51a and 52 distributed over the periphery of the tube, and these rollers are secured, by means of a holder 53, to the cabin frame 54. The rollers 51, 51a serve both for lateral guidance and for the stabilization of the frame about one axis, while the roller 52 serves for the lateral guidance in the other direction. In place of the tubular guide 47 it would also be possible to use a T-shaped or otherwise suitably profiled guide.

In FIGURE 6 there is represented a sliding guide having a rail 55 secured to a holder 56, and guided in a U-shaped shoe 57. The shoe 57 is secured to a holder 58 of the cabin frame 59.

Since the extremely unfavourable height-width ratio of the cabin frame of approximately 0.4:1 renders stabilization of the cabin floor by guides alone impossible, beside the use of the described, tongue-shaped guides, two separate cable lines are also used. The lift cabin is thus suspended not from one but from two separately acting cable lines, each of which is anchored to a different half of the building. The more detailed construction of the cable suspension is illustrated in FIGURES 7, 8 and 9. A drive pulley 66 supports carrier cables leading to the pairs of carrier cable pulleys 65 and 65a. The carrier cables are divided into two lines 64 and 64a and are anchored separately to the ceiling. The anchoring points are designated by 46′ and 46a′.

Furthermore a checking device is provided, comprising cables 67 and 67a. These cables are guided down through or beside the cabin frames 63, 63a. In place of cables it is also possible for steel anchors, of any profile suitable for the checking device, to be used. The cables or anchors are connected with an arresting device 70. This comprises catching wedges 71, which are subject to the action of springs 72. For the arresting of the wedges 71 trigger rods 73, 73a are provided. The rods 73 and 73a are connected with a trigger device 74, which is actuated in known manner by a centrifugal governor or the like. The anchoring of the check cables is designated by 68, 68a. The cable anchoring takes place in resiliently or yieldably sliding fashion, by means of mechanical friction or hydraulic damping.

In FIGURE 10 the cable guidance may be seen in plan. The two separate cable lines 79, 79a are united in the middle and guided commonly over a drive pulley 80. From the drive pulley the cable lines are attached, and run over a reversing roll 81 and over support rolls 83, to the counter-weight 82.

Another style of cable guidance is represented in FIGURES 11 and 12. In the case of this embodiment the cabin 100 is provided with a cabin floor 111, upon which transverse movement trucks run. The cabin 100 is provided with carrier rollers 107. Two carrier cable lines 110 and 110′ are provided, which are anchored to the upper part of the building at 122 and 122′. The cable lines lead over carrier rollers 107, over reversing rollers 120, 120′ to a drive pulley 116 and then directly down to the carrier rollers 121 of the counter-weight 106. The cable lines are then anchored at 124. A motor 117 is provided for the drive of the drive pulley 116, and is connected with the drive pulley through a gearing 118, 119. The independent check cables, which are resiliently secured to the upper part of the building, are designated by 98 and 98′.

What I claim is:

1. In combination with a garage for vehicles, said garage having a vertical shaft and a plurality of stories, each story having a storage space which is open relatively to said shaft; a vehicle-hoisting device comprising at least two elevator cabins located side by side in said shaft, each of said cabins comprising a floor adapted to support a plurality of vehicles placed side by side, and a frame connected with said floor and having vertical frame portions located diagonally opposite each other adjacent opposite walls of said shaft; vertical guides secured to said opposite shaft walls adjacent said vertical frame portions and engaging therewith for guiding said cabins, and means connected with said cabins for moving said cabins up and down in said shaft.

2. In combination with a garage for vehicles, said garage having a vertical shaft and a plurality of stories, each story having a storage space which is open relatively to said shaft; a vehicle-hoisting device comprising at least two elevator cabins located side by side in said shaft, each of said cabins comprising a floor adapted to support a plurality of vehicles placed side by side, and a frame connected with said floor and having vertical frame portions located diagonally opposite each other adjacent opposite walls of said shaft; vertical guides secured to said opposite shaft walls adjacent said vertical frame portions and engaging therewith for guiding said cabins, parallel cable-supporting pulleys carried by each cabin, a common drive pulley, cable lines extending under said cable-supporting pulleys and vertically adjacent one another over a central portion of the cabin and over said common drive pulley means actuating said pulley, said cable lines being anchored at one end to opposite vertical sides of said shaft and a counter weight, said cable lines extending over said counter-weight and being anchored at the other end to a common point outside said shaft.

References Cited in the file of this patent

UNITED STATES PATENTS

| | | |
|---|---|---|
| 604,360 | Bell | May 24, 1898 |
| 943,523 | Cunningham | Dec. 14, 1909 |
| 1,605,220 | Cuvillier | Nov. 2, 1926 |
| 1,710,552 | Rood | Apr. 23, 1929 |
| 1,891,795 | Buettell | Dec. 20, 1932 |
| 2,309,123 | Kiesling | Jan. 26, 1943 |
| 2,702,606 | Young | Feb. 22, 1955 |
| 2,712,875 | Leopold | July 12, 1955 |
| 2,815,133 | Asheim | Dec. 3, 1957 |